(12) United States Patent
Knoedler-Bunte et al.

(10) Patent No.: US 12,344,171 B2
(45) Date of Patent: Jul. 1, 2025

(54) MOTOR VEHICLE LIGHTING MODULE

(71) Applicant: Bayerische Motoren Werke Aktiengesellschaft, Munich (DE)

(72) Inventors: Andreas Knoedler-Bunte, Munich (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/684,897

(22) PCT Filed: Oct. 7, 2022

(86) PCT No.: PCT/EP2022/077950
§ 371 (c)(1),
(2) Date: Feb. 20, 2024

(87) PCT Pub. No.: WO2023/072555
PCT Pub. Date: May 4, 2023

(65) Prior Publication Data
US 2024/0426445 A1 Dec. 26, 2024

(30) Foreign Application Priority Data

Oct. 27, 2021 (DE) ...................... 10 2021 127 904.6

(51) Int. Cl.
*B60R 13/00* (2006.01)
*B60Q 1/26* (2006.01)
*G09F 13/04* (2006.01)
*G09F 21/04* (2006.01)

(52) U.S. Cl.
CPC .......... *B60R 13/005* (2013.01); *B60Q 1/2619* (2013.01); *G09F 13/044* (2021.05); *G09F 21/048* (2013.01)

(58) Field of Classification Search
CPC ..... F21S 41/24; F21S 41/145; G09F 13/0418; G09F 13/044; G09F 21/048;
(Continued)

(56) References Cited

U.S. PATENT DOCUMENTS 9,656,598 B1 * 5/2017 Salter ...................... G02B 6/002
2006/0007692 A1 * 1/2006 Hsien ...................... B60Q 1/263
362/382
(Continued)

FOREIGN PATENT DOCUMENTS

DE 299 12 270 U1 1/2001
DE 10 2016 114 744 A1 2/2017
(Continued)

OTHER PUBLICATIONS

International Search Report (PCT/ISA/210) issued in PCT Application No. PCT/EP2022/077950 dated Feb. 22, 2023 with English translation (5 pages).
(Continued)

*Primary Examiner* — Erin Kryukova
(74) *Attorney, Agent, or Firm* — Crowell & Moring LLP

(57) ABSTRACT

A motor vehicle lighting module includes a housing which is made of a housing part and a circular or elliptical outer part secured thereto. The outer part is at least partly translucent and closes off the housing from the outside. The motor vehicle lighting module additionally has a plurality of light beam-emitting light sources which are received in the housing. The housing is equipped with a light guide system into which the light sources emit the light beams. The housing is additionally equipped with a facet body with an upper part, a girdle, and a lower part. The upper part of the facet body adjoins the outer part, and the lower part pro-
(Continued)

trudes in the direction of the housing part. The light guide system additionally includes a first light guide and a second light guide.

16 Claims, 2 Drawing Sheets

(58) Field of Classification Search
CPC ... B60R 13/004; B60R 13/005; B60Q 1/2619; F21Y 2107/90
See application file for complete search history.

(56) References Cited

U.S. PATENT DOCUMENTS

| | | | |
|---|---|---|---|
| 2017/0043709 A1* | 2/2017 | Dellock | ............ F21S 43/19 |
| 2019/0092216 A1 | 3/2019 | Min et al. | |
| 2021/0054983 A1 | 2/2021 | Buschmann | |

FOREIGN PATENT DOCUMENTS

| | | | |
|---|---|---|---|
| DE | 20 2018 004 425 U1 | 10/2018 | |
| DE | 102017214129 A1 * | 2/2019 | ........... B60R 13/005 |
| DE | 10 2018 003 553 A1 | 11/2019 | |
| JP | 2016-21388 A | 2/2016 | |

OTHER PUBLICATIONS

German-language Written Opinion (PCT/ISA/237) issued in PCT Application No. PCT/EP2022/077950 dated Feb. 22, 2023 with English translation (15 pages).

German-language Search Report issued in German Application No. 10 2021 127 904.6 dated Jun. 15, 2022 with partial English translation (10 pages).

* cited by examiner

MOTOR VEHICLE LIGHTING MODULE

BACKGROUND AND SUMMARY

The invention relates to a motor vehicle lighting module which comprises a housing, a plurality of light sources emitting light beams, which are accommodated in the housing, and a light guide system arranged in the housing, into which the light sources emit the light beams. The housing is formed by a housing part and a circular or elliptical outer part attached thereto, wherein the outer part is at least partially translucent and closes off the housing from the outside.

Such a motor vehicle lighting module is known, for example, from DE 10 2018 003 553 A1. In order to be able to provide the motor vehicle lighting module with a small number of electronic and optical components, it is proposed to provide a disk-shaped light guide in the housing and to arrange the light sources in such a way that a circular or elliptical ring is formed, in which the light guide lies at least partially. The light guide has at least one shoulder on its circumference and projects beyond the ring formed by the light sources in the radial direction. The circular upper part of the lighting module has an emblem of a motor vehicle manufacturer, which is illuminated by the light beams emitted by the light sources. A disadvantage of this known motor vehicle lighting module is that only uniform illumination of the upper part and thus of the emblem is possible.

It is the object of the invention to provide a motor vehicle lighting module in which regionally different lighting, for example of a motor vehicle emblem, is possible with a small number of electronic and optical components. It is further the object of the invention to provide a motor vehicle with such a motor vehicle lighting module.

These objects are achieved by a motor vehicle lighting module and a motor vehicle according to the claimed invention.

According to a first aspect of the invention, a motor vehicle lighting module is provided which comprises a housing, a plurality of light sources emitting light beams and a light guide system. The housing is formed by a housing part and a circular or elliptical outer part attached to it. The outer part is at least partially translucent and closes off the housing from the outside. The circular or elliptical outer part can, for example, comprise an emblem of the motor vehicle manufacturer and the light beams emitted by the light sources can serve to illuminate such an emblem. The plurality of light sources emitting light beams are accommodated in the housing. The light guide system is arranged in the housing into which the light sources emit the light beams.

According to embodiments of the invention, a facet body with an upper part, a girdle and a lower part is arranged in the housing, wherein the upper part of the facet body adjoins the outer part and the lower part protrudes in the direction of the housing part. The light guide system comprises a first light guide and a second light guide. The first light guide comprises a disk-shaped section, wherein the girdle of the facet body lies in a central recess of the disk-shaped section. The second light guide is configured as a conical, curved body, the curvature of which runs around the underside of the facet body. The light sources are arranged in such a way that they feed light into the first light guide and into the second light guide, whereby light is introduced from the disk-shaped section of the first light guide into the adjacent outer part as well as from the side into the girdle and from below into the lower part of the facet body.

The light fed in via the underside of the facet body via the second light guide enables selective illumination of a surface area of the outer part that adjoins the facet body. The light introduced into the girdle of the facet body from the side (i.e. in the plane of the disk-shaped section of the first light guide) enables sparkling in the surface area of the outer part that adjoins the facet body. These two lighting effects are superimposed here. In contrast, the disk-shaped section of the first light guide surrounding the facet body enables homogeneous illumination of the outer part in the form of a ring or an ellipse, whereby, for example, peripheral parts of the emblem can be particularly highlighted.

Due to this configuration the light can emerge at different intensities on different sections of the outer part. This makes it possible to achieve a particularly high-quality appearance of the motor vehicle lighting module. At the same time, the illumination of the outer part of the motor vehicle lighting module can be realized with a small number of light sources and a small number of components overall.

In an expedient embodiment, the disk-shaped section of the first light guide adjoins the outer part. This ensures low-loss light emission from the first light guide and into the outer part. The two components can be adapted to one another in terms of their surface and/or arrangement in such a way that there is no air gap between the light exit surface and the light entry surface. Optionally, air or another medium can also be arranged between the light exit surface and the light entry surface.

In a further expedient embodiment, a disk-shaped circuit carrier with a recess is arranged between the first light guide and the second light guide. The disk-shaped circuit carrier, which preferably has a size and shape that corresponds to the disk-shaped section of the first light guide, enables the arrangement and holding of the light sources, whereby the above-described light emission into the first and second light guides is possible.

In particular, a first partial number of the light sources is arranged on an upper side of the disk-shaped circuit carrier directed toward the outer part in such a way that a circular or elliptical ring is formed in order to emit the light beams into a lower main surface of the disk-shaped section of the first light guide. As a result, it is possible to emit substantially homogeneous light in a section of the outer part, which corresponds to the shape of the disk-shaped section of the first light guide in a plan view of the motor vehicle lighting module and runs around the surface area of the outer part, which adjoins the facet body.

In a further expedient embodiment, a plurality of recesses with facet surfaces are introduced on the upper side of the disk-shaped section of the light guide directed toward the outer part. The recesses with facet surfaces represent special optics which enable light to be directed in different directions within the disk-shaped section of the first light guide and in particular enable an irregular introduction of light into the girdle of the facet body.

It is preferred here if the plurality of recesses with a facet surface corresponds to the first partial number of light sources on the upper side of the disk-shaped circuit carrier directed toward the outer part, wherein a respective one of the light sources is assigned to a recess with a facet surface. Furthermore, additional light sources can also optionally be provided on the upper side of the disk-shaped circuit carrier directed towards the outer part.

By assigning a light source to a recess with a facet surface, it is possible to direct part of the light emitted by the light source in the direction of the girdle of the facet body. In this way, similar to the sparkling of a crystal, light effects can be created in the surface area of the outer part, which in a plan view approximately corresponds to the surface of the facet body. The recesses with faceted surfaces direct light bundles into the girdle of the facet body, creating an effect that corresponds to the sparkling of a crystal ("sparkle" effect).

It is furthermore expedient if the light sources arranged on the upper side of the disk-shaped circuit carrier directed toward the outer part are arranged in such a way that they come to lie in a direction parallel to a central axis below the assigned recess with a facet surface. This ensures that light bundles are directed into the girdle of the facet body in the manner described above and create the effect of crystal sparkling.

According to a further expedient embodiment, a second partial number of light sources is arranged on an underside of the disk-shaped circuit carrier directed toward the housing part in such a way that a circular or elliptical ring is formed in order to direct the light beams into the second light guide, in particular a circular or elliptical end face of the second light guide. This makes it possible to feed light into the conical, curved body of the second light guide and to emit it from the interior of the housing in the direction of the facet body. For this purpose, the second light guide has a suitable light coupling-out structure, at least in some areas. According to the configuration of the lower part of the facet body and/or the light coupling-out structure, it is hereby possible to achieve a flat illumination in the surface area of the outer part that adjoins the facet body.

A further embodiment provides that the facet body has a large number of facets on the lower part. As a result, the light fed into the facet body through the second light guide is guided through the facet body in different directions until it emerges from the upper side of the facet body and is emitted through the adjacent outer part. This results in illumination with different brightness in the surface area of the outer part that adjoins the facet body.

In order to make the illumination of the outer part different in sections in the surface area of the outer part that adjoins the facet body, the facet body according to a further expedient embodiment is provided with a translucent and reflective coating on the lower part in some areas. The translucent and reflective coating enables light to be fed in from the second light guide. The reflective properties allow light to be reflected within the facet body.

Alternatively or additionally, the facet body on the lower part is expediently provided with an opaque and reflective color layer in some areas. In combination with the partially translucent and reflective coating, an emblem corresponding to the manufacturer's logo can be created. For example, two quarter circle segments opposite each other on a circle can be provided with a translucent and reflective coating as well as an opaque and reflective color layer in the manner of a propeller.

A further expedient embodiment provides that the disk-shaped section of the first light guide additionally emits light radiation via the end face opposite the girdle into an annular section of the first light guide, which adjoins the outer part with a light exit surface. This allows a luminous outer ring to be created on the outer part. The light exit surface of the annular section of the first light guide and the associated interface of the outer part can be adapted to one another in terms of their surface and/or arrangement in such a manner that there is no air gap between the light exit surface and the light entry surface, so they adjoin one another directly. Optionally, air or another medium can also be arranged between the light exit surface and the light entry surface of the outer part.

According to a further expedient embodiment, the disk-shaped section of the first light guide additionally emits light radiation via the upper main surface into the outer part. Accordingly, for example, an annular surface area of the outer part, which overlaps with the disk-shaped section of the first light guide in plan view, can be illuminated in a highlighted manner.

It is furthermore expedient if the light sources are configured to emit white light. The lighting effects of the motor vehicle lighting module are not caused by the color of the light sources, but exclusively by the structural design of the facet body, the light guide system and the arrangement of the light sources. The light sources are preferably configured to emit light with a constant luminous flux.

This provides a motor vehicle lighting module that enables particularly high-quality lighting, for example of an emblem of a motor vehicle manufacturer.

According to another aspect of the present invention, a motor vehicle is provided with a motor vehicle lighting module as described herein, wherein this is configured in accordance with one or more embodiments of the invention.

Further features, configurations and advantages are explained hereinafter with reference to the description of an exemplary embodiment shown in the figures.

DETAILED DESCRIPTION OF THE DRAWINGS

In the figures, identical components are provided with identical reference numbers.

Figure 1:
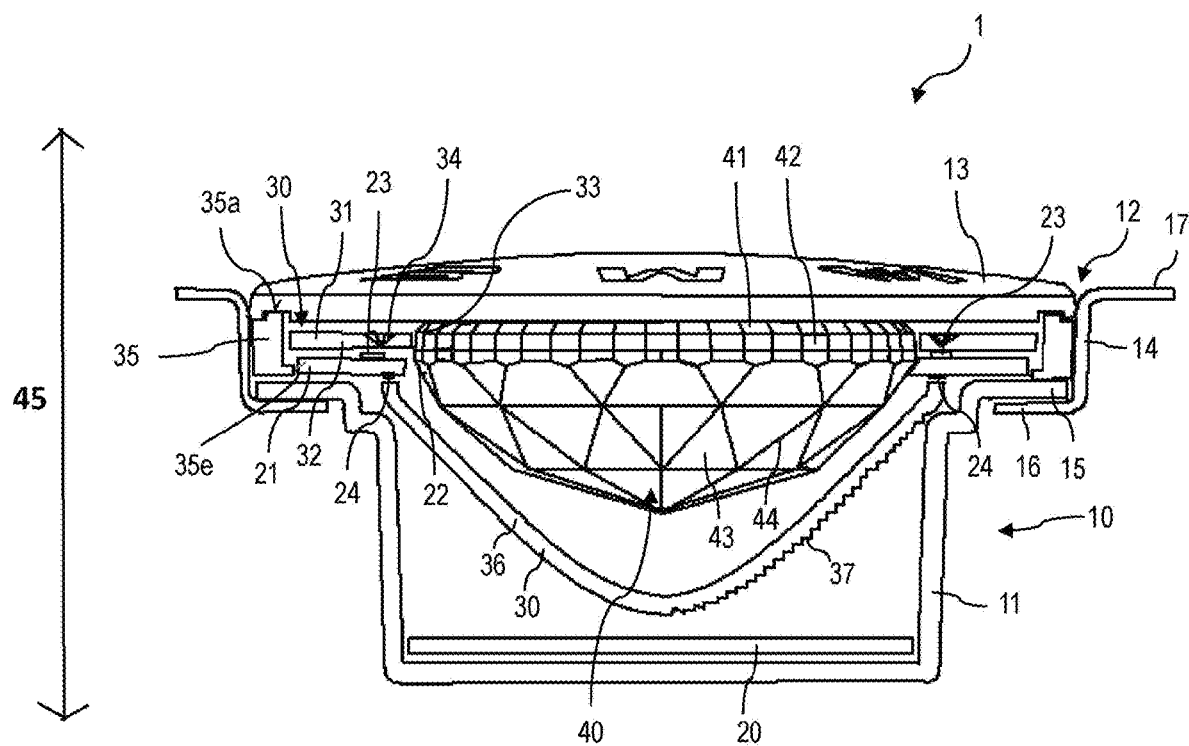
FIG. 1 shows a sectional view through a motor vehicle lighting module according to embodiments of the invention.
Figure 2:
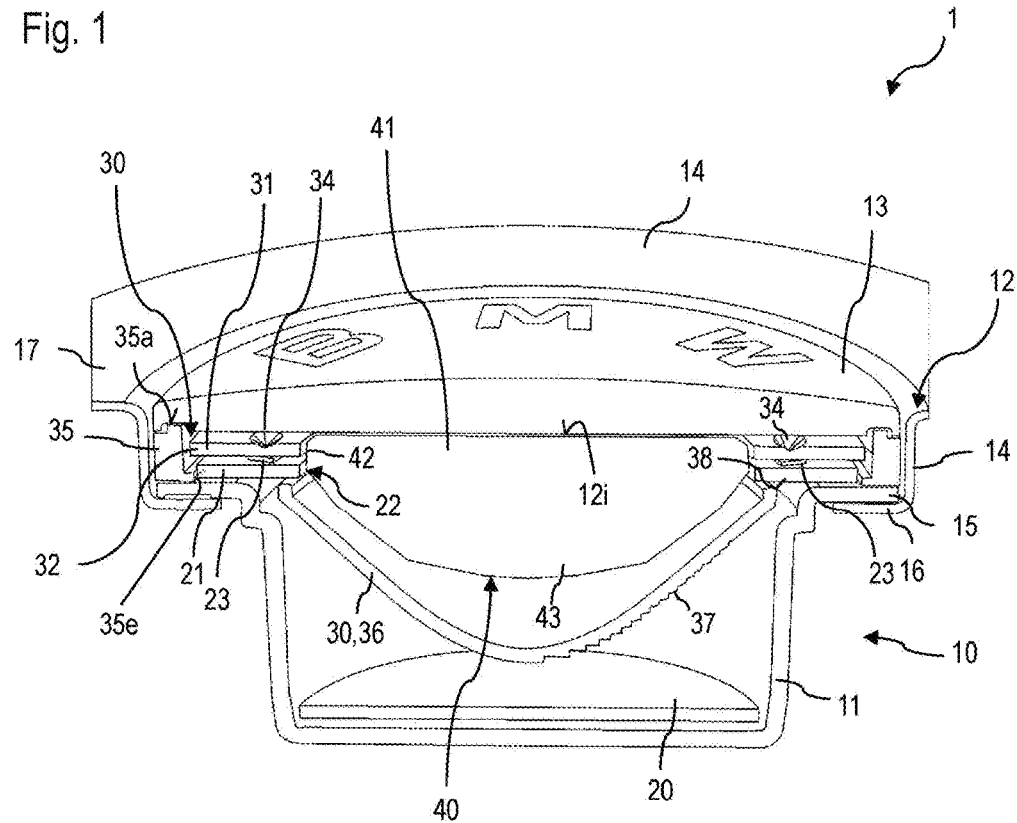
FIG. 2 shows a sectional perspective view through the motor vehicle lighting module shown in FIG. 1.

FIGS. 1 and 2 show a motor vehicle lighting module 1 according to embodiments of the invention in a cross-sectional view. The motor vehicle lighting module 1 comprises a housing 10, which is formed by a pot-shaped or cup-shaped housing 11 and a circular outer part 12 attached thereto. The outer part 12 can also have a shape that deviates from the circular shape, e.g. the shape of an ellipse. The outer part 12 is partially translucent and closes off the housing 10 to the outside. A flange 15 of the housing part 11 lies on a bottom 16 of an annular depression 14 of a body panel, e.g. a hood, a trunk hood and the like. The outer part 12, which has an emblem 13 of a motor vehicle manufacturer, closes off substantially flush with a main surface 17 of the body panel.

In the exemplary embodiment shown in the figures, the housing part 11 and the outer part 12 are not connected directly to one another, but rather to one another via a component of a light guide system described hereinafter. The mechanical connection between housing part 11 and outer part 12 could also be direct, contrary to the drawings.

A plurality of light sources 23, 24 emitting light beams, a light guide system 30 into which the light sources 23, 24 emit light beams, and a facet body 40 are arranged inside the housing.

The facet body 40 comprises an upper part 41, a girdle 42 and a lower part 43 having a plurality of facets 44. While the upper part 41 of the facet body 40 adjoins an inner side 12i of the outer part 12, the lower part 43 projects in the direction of the cup-shaped housing part 11. An interface of the upper part 41 of the facet body 40 and the inner side 12i of the outer part 12 can be adapted to one another in terms of their surface and/or arrangement in such a way that there is no air gap between them. Optionally, air (air gap of predetermined thickness) or another light-conducting medium can also be arranged between the interface of the upper part 41 of the facet body 40 and the inner side 12i of the outer part 12.

The facet body 40 is provided with a translucent and reflective coating on the lower part 43 in at least one area, preferably two areas that are diagonally opposite one another. In the area or areas not provided with the translucent and reflective coating, the facet body 40 is provided on the lower part with an opaque and reflective color layer, which is a color of the motor vehicle manufacturer's emblem. The color blue, for example, can be selected as the color.

The light guide system 30 includes a first light guide 31 and a second light guide 36, each made of a light-conducting material. The first light guide 31 comprises a disk-shaped section 32 and an annular section 35.

The disk-shaped section 32 lies in a plane which extends approximately parallel to the main surface 17 of the body panel. The annular section 35 of the first light guide 31 on the one hand mechanically connects the housing part 11 to the outer part 12. The annular section 35 comes to rest along the entire circular circumference of the outer part 12. Substantially, the shape of the annular section 35 can be considered to be cylindrical, wherein a cylinder axis extends approximately perpendicular to the main surface 17 of the body panel. An interface, which is a light exit surface 35a of the annular section 35, and the inner side 12i of the outer part 12 can be adapted to one another in their surface and/or arrangement so that there is no air gap between them. Optionally, air (air gap of predetermined thickness) or another light-conducting medium can also be arranged between the light exit surface 35a of the annular section 35 and the inner side 12i of the outer part 12.

The disk-shaped section 32 of the first light guide 31 comes to rest within the annular section 35, wherein a radially outer end face 31a of the disk-shaped section 32 lies opposite a coupling-in surface 35e of the annular section 35. Furthermore, the disk-shaped section 32 comprises a central recess 33, so that the girdle 42 of the facet body 40 comes to rest in the recess 33. The girdle 42 is thus located in the plane of the disk-shaped section. The disk-shaped section 32 has the shape of a flat ring in a plan view from above. The light exit surface 35a of the annular section 35 and the coupling-in surface 35e of the annular section 35 are inclined at approximately 90° to one another in the present example, wherein the angle of inclination can also be selected differently.

The second light guide 36 is configured as a conical, curved body, wherein the curvature runs around the underside 43 of the facet body 40. As can be seen from the illustrations in FIGS. 1 and 2, the second light guide 36 has a light coupling-out structure 37 in some areas. The light coupling-out structure influences the lighting effect of the motor vehicle lighting module 1 that is later perceived by the viewer and can be configured depending on the shape of the emblem to be illuminated.

A disk-shaped circuit carrier 21 is arranged between the first light guide 31, more precisely between the disk-shaped section 32 of the first light guide 31, and the second light guide 36, which circuit carrier has a central recess 22 through which the facet body 40 protrudes with its lower part adjacent to the girdle 42. The disk-shaped circuit carrier 21 and the disk-shaped section 32 of the first light guide 31 each run in two planes, which are each parallel to the main surface 17 of the body panel. Their sizes correspond approximately to one another in a plan view of the motor vehicle lighting module 1.

On an upper side of the disk-shaped circuit carrier directed toward the outer part 12, a first partial number of light sources 23 is arranged in such a way that a circular or elliptical ring is formed. In a corresponding manner, a second partial number of light sources 24 is arranged on an underside of the disk-shaped circuit carrier 21 directed toward the housing part 11 in such a way that a circular or elliptical ring is formed. The first and second partial numbers of light sources 23, 24 can be chosen to be the same or different.

The electronic components (not shown) required to control the light sources 23, 24 are provided on a circuit carrier 20, which is arranged on the bottom of the housing part 11. The electrical connection between the electronic components on the circuit carrier 20 and the light sources 23, 24 on the disk-shaped circuit carrier 21 is accomplished, for example, via one or more ribbon cables as well as printed conductor track structures on the circuit carriers 20, 21.

The first partial number of light sources 23 emits the light beams into a lower main surface 31u of the disk-shaped section 32 of the first light guide 31. The second partial number of light sources 24 is arranged on the underside of the disk-shaped circuit carrier 21 in such a way that the light beams can be fed into the second light guide 36, in particular its circular end face 38 (see e.g. FIG. 3). The end face 38 thus forms a light coupling-in surface of the second light guide 36.

A plurality of recesses 34 with facet surfaces are incorporated on the upper side 31o of the disk-shaped section 32 of the first light guide 31, which is directed toward the outer part. The recesses 34 with facet surfaces represent special optics that within the disk-shaped section 32 enable light to be directed in different directions within the disk-shaped section 32 of the first light guide 31. In particular, these cause an irregular introduction of light into the girdle 42 of the facet body 40.

Figure 3:
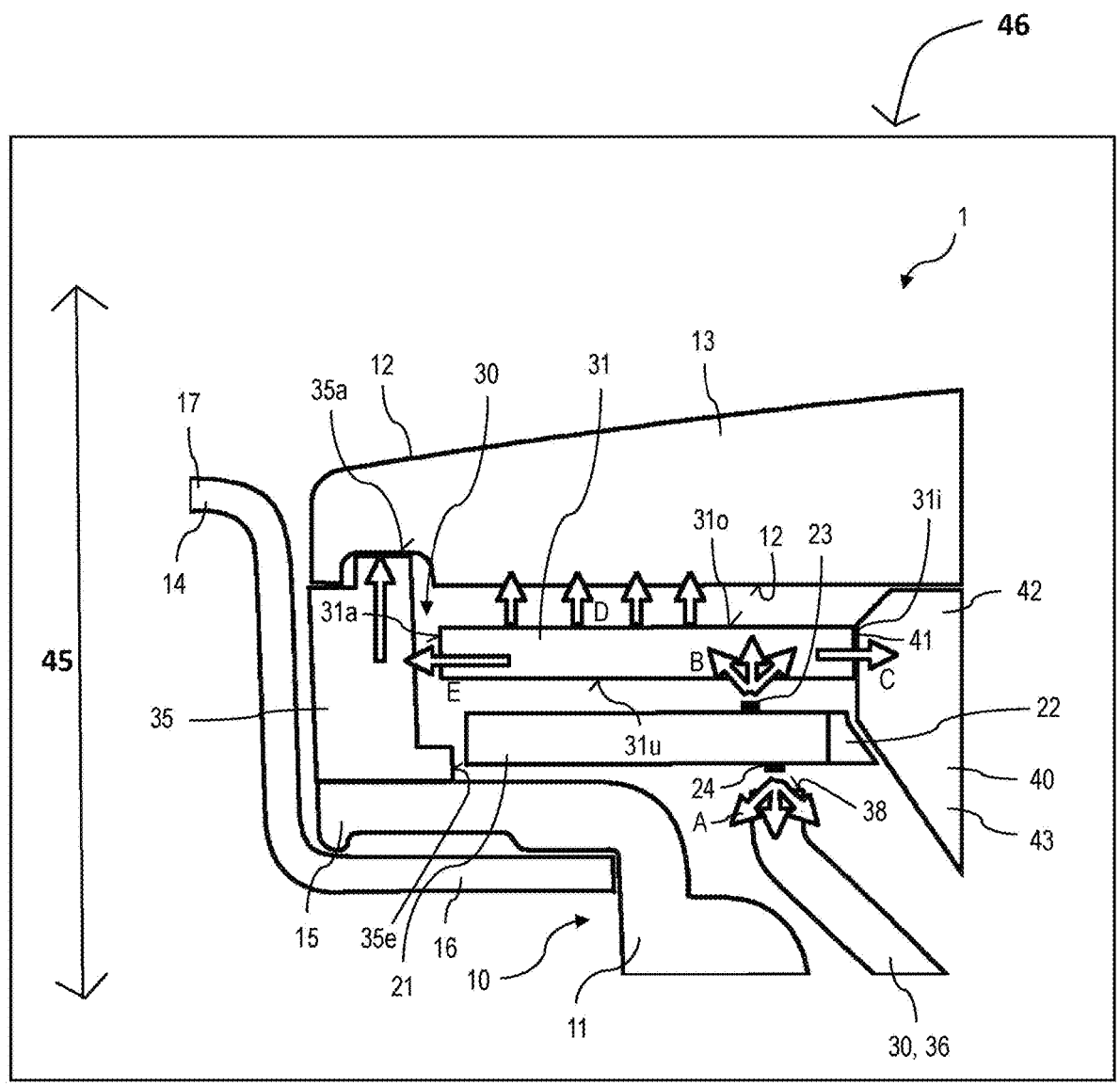
FIG. 3 shows an enlarged sectional view through the motor vehicle lighting module shown in FIG. 1, in which the feeding of light into the light guide system is shown in more detail.

The number of recesses 34 with facet surfaces preferably corresponds to the first partial number of light sources 23. The number of light sources 23 can also be larger than the number of recesses 34 with facet surfaces. A respective one of the light sources 23 is assigned to a recess with a facet surface, wherein the light sources 23 are arranged on the upper side of the disk-shaped circuit carrier 21 directed toward the outer part 12 in such a way that they come to rest in a direction parallel to a central axis 45 below the assigned recess with a facet surface. In FIGS. 1 and 3, the central axis 45 extends vertically from top to bottom in the direction of the drawing.

The lighting effect achieved by way of the described structure is described hereinafter in particular with reference to FIG. 3.

FIG. 3 shows an enlarged sectional view through the outer edge region of the motor vehicle lighting module 1 shown in FIG. 1. It can be clearly seen that the disk-shaped circuit carrier 21 with light sources 23, 24 arranged on its upper side and underside is arranged between the disk-shaped section 32 of the light guide 31 and the second light guide 36 of the light guide system 30. In the sectional view, only one light source 23 arranged on the upper side of the disk-shaped circuit carrier 21 can be seen. Likewise, as a result of the sectional view, only one light source 24 arranged on the underside of the second circuit carrier 21 can be seen.

The light sources 24 arranged on the underside of the circuit carrier 21 are arranged in such a way that a circular ring is formed, so that the light beams A substantially enter the end face 38 of the second light guide 36. There, the introduced light beams propagate downward within the second light body 36 and are directed toward the lower part 43 of the facet body 40 via the light coupling-out structures 37 shown in FIGS. 1 and 2. The light beams entering the facet body propagate within the facet body 40, whereby, depending on the angle of entry, they are not reflected, are reflected once or are reflected multiple times, at interfaces of the facet body 40, and finally emerge from the facet body 40 via the upper part 41. In doing so, they pass through the outer part 12 and ensure an extensive illumination of the motor vehicle lighting module 1, in a surface area of the outer part 12 that adjoins the facet body 40.

As a result of the light beams fed into the second light guide 36, a substantially flat, but not completely uniform, illumination of the outer part 12 due to the reflection properties of the facet body 40 is brought about in the (central, round) surface area in which the outer part 12 adjoins the facet body 40.

As described above, the light sources 23 are arranged on the upper side of the disk-shaped circuit carrier 21 directed toward the outer part 12 in such a way that a circular ring is formed in order to feed light beams B into the lower main surface 31u of the disk-shaped section 32 of the first light guide 31. Since the light source 23 comes to rest in a direction parallel to the central axis below the associated recess 34 with a facet surface, the light beams B fed from the light source 23 into the lower main surface 31u are divided in three ways.

A first part of the introduced light beams is guided (arrow C) in the direction of the radially inner end face 31i of the disk-shaped section 32 and fed into the girdle 42 of the facet body 40.

A second part of the part of light beams (arrow D) fed into the lower main surface 31u of the disk-shaped section 32 of the first light guide 31 emerges from the upper main surface 31o and is emitted in a ring shape to the outer side 12 in accordance with the annular shape of the disk-shaped section. The light within the disk-shaped section is distributed uniformly via light-guiding structures provided in the disk-shaped section of the first light guide 31, so that it can emerge uniformly from the upper main surface 31o of the disk-shaped section and enter the adjacent inner side 12i of the outer side 12. This results in a homogeneous illumination in a section which, in a plan view, corresponds to the disk-shaped section 32 of the first light guide 31.

A third part of the light fed in by the light source 23 is directed radially outward through the recess 34 with a facet surface and emerges from the disk-shaped section 32 of the first light guide 31 via the radially outer end face 31a (arrow E). The light is fed into the coupling-in surface 35e of the annular section 35 of the first light guide 31, is deflected there and exits the annular section 35 via the annular light exit surface 35a. The light exit surface 35a, as described, directly adjoins the inner side 12i of the outer part 12. The light exit surface 35a lies radially outside the disk-shaped section, whereby the light emerging from the outer part 12 shines as an outer ring. A desired color effect, e.g. the manufacturer's logo of the motor vehicle manufacturer, can be achieved by suitable coloration and translucent or opaque regions of the outer part 12, which can be applied for example by suitable color painting.

Through the facet body 40 and the feed of light both from the underside via the second light guide 36 and via the first light guide 31 and the side feed, a sparkling effect is achieved in the central surface area of the outer part 12 of the motor vehicle lighting module 1. By painting the facet body in the area of its lower part 43, as already described above, a color and illumination corresponding to the manufacturer's emblem can be achieved. The motor vehicle lighting module 1 may be arranged within a motor vehicle 46, which is schematically illustrated in FIG. 3.

It goes without saying that, depending on the desired lighting effect, wherever light emerges from an interface and light enters an associated interface, no air gap, an air gap or another light-guiding medium can optionally be provided.

REFERENCE LIST

1 Motor vehicle lighting module
10 Housing
11 Housing part
12 Outer part
12i Inner side of the outer part 12
13 Emblem
14 Annular depression of a body panel
15 Flange
16 Bottom of the annular depression
17 Main surface of the body panel
20 Circuit carrier
21 Disk-shaped circuit carrier
22 Recess of the disk-shaped circuit carrier
23 Light source on upper side of the disk-shaped circuit carrier (facing the outside part)
24 Light source on the underside of the second circuit carrier (facing the housing part)
30 Light guide system
31 First light guide of the light guide system
31u Lower main surface of the disk-shaped section of the first light guide
31o Upper main surface of the disk-shaped section of the first light guide
31a Radially outer end face of the disk-shaped section of the first light guide
31i Radially inner end face of the disk-shaped section of the first light guide
32 Disk-shaped section of the first light guide
33 Central recess of the disk-shaped section of the first light guide
34 Recess with facet surface
35 Annular section of the first light guide
35a Light exit surface of the annular section
35e Coupling-in surface of the annular section
36 Second light guide of the light guide system
37 Light coupling-out structure
38 End face of the second light guide
40 Facet body
41 Upper part of the facet body
42 Girdle of the facet body
43 Lower part of the facet body
44 Facets of the lower part
45 Central axis
46 Motor vehicle

What is claimed is:

1. A motor vehicle lighting module comprising:
    a housing which is formed by a housing part and a circular or elliptical outer part attached to the housing part, wherein the outer part is at least partially translucent and closes off the housing to an outside, a plurality of light sources that emit light beams, wherein the light sources are accommodated in the housing, and a light guide system arranged in the housing, into which the light sources emit the light beams, wherein:

a facet body comprising an upper part, a girdle and a lower part is arranged in the housing, wherein the upper part adjoins the outer part and the lower part projects in a direction of the housing part, the light guide system comprises a first light guide and a second light guide, wherein the first light guide comprises a disk-shaped section, wherein the girdle of the facet body lies in a central recess of the disk-shaped section, and wherein the second light guide is configured as a conical, curved body, the curvature of which runs around an underside of the facet body, the light sources are arranged such that the light sources feed light into the first light guide and into the second light guide, a first portion of light emitted from the disk-shaped section of the first light guide is introduced into a side of the girdle, a second portion of light emitted from the disk-shaped section of the first light guide is introduced into the outer part, and a third portion of light emitted from the second light guide is introduced into the lower part of the facet body.

2. The motor vehicle lighting module according to claim 1, wherein the disk-shaped section of the first light guide adjoins the outer part.

3. The motor vehicle lighting module according to claim 1, wherein a disk-shaped circuit carrier with a recess is arranged between the first light guide and the second light guide.

4. The motor vehicle lighting module according to claim 3, wherein a first partial number of the light sources is arranged on an upper side of the disk-shaped circuit carrier directed toward the outer part such that a circular or elliptical ring is formed in order to emit the light beams into one lower main surface of the disk-shaped section of the first light guide.

5. The motor vehicle lighting module according to claim 4, wherein a plurality of recesses with facet surfaces are introduced on an upper side of the disk-shaped section of the first light guide directed toward the outer part.

6. The motor vehicle lighting module according to claim 5, wherein the plurality of recesses with facet surfaces correspond to the first partial number of the light sources on the upper side of the disk-shaped circuit carrier directed toward the outer part, and a respective one of the light sources is assigned to a respective recess with a respective facet surface.

7. The motor vehicle lighting module according to claim 6, wherein the light sources arranged on the upper side of the disk-shaped circuit carrier directed toward the outer part are arranged such that each of the light sources lies in a direction parallel to a central axis below an associated recess.

8. The motor vehicle lighting module according to claim 4, wherein a second partial number of the light sources is arranged on an underside of the disk-shaped circuit carrier directed toward the housing part such that a circular or elliptical ring is formed to emit the light beams into the second light guide.

9. The motor vehicle lighting module according to claim 4, wherein a second partial number of the light sources is arranged on an underside of the disk-shaped circuit carrier directed toward the housing part such that a circular or elliptical ring is formed to emit the light beams into a circular or an elliptical end face of the second light guide.

10. The motor vehicle lighting module according to claim 1, wherein the facet body has a plurality of facets on the lower part.

11. The motor vehicle lighting module according to claim 1, wherein the facet body on the lower part is provided with a translucent and reflective coating in some regions.

12. The motor vehicle lighting module according to claim 1, wherein the facet body on the lower part is partially provided with an opaque and reflective color layer in some regions.

13. The motor vehicle lighting module according to claim 1, wherein the disk-shaped section of the first light guide additionally emits light radiation via an end face opposite the girdle into an annular section of the first light guide, which adjoins the outer part with a light exit surface.

14. The motor vehicle lighting module according to claim 1, wherein the disk-shaped section of the first light guide emits the second portion of the light via an upper main surface into the outer part.

15. The motor vehicle lighting module according to claim 1, wherein the light sources are configured to emit white light.

16. A motor vehicle comprising the motor vehicle lighting module according to claim 1.

* * * * *